UNITED STATES PATENT OFFICE.

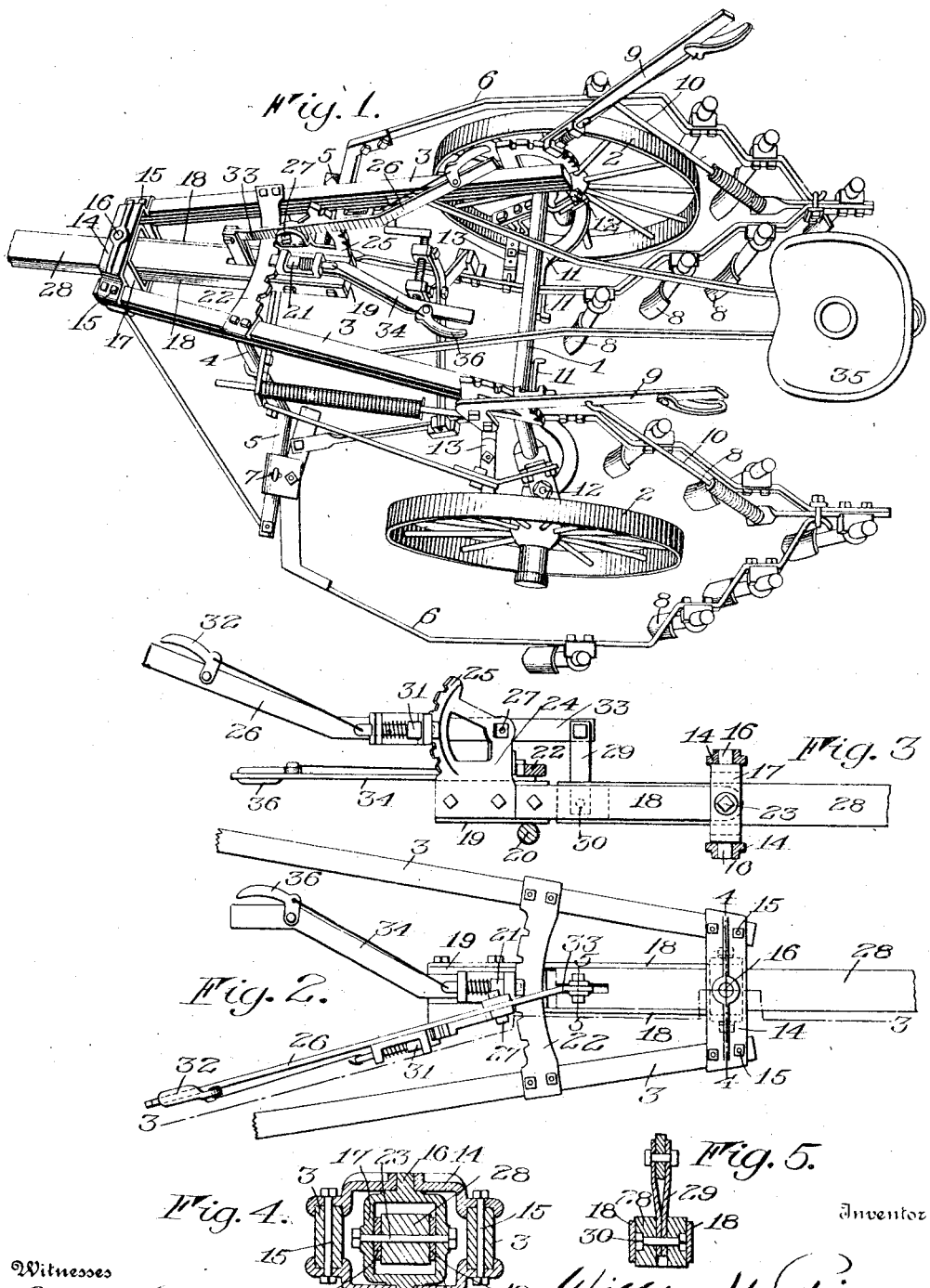

WILLIAM H. RICE, OF ROCHESTER, NEW YORK.

AGRICULTURAL IMPLEMENT.

1,053,221.  Specification of Letters Patent.  Patented Feb. 18, 1913.

Application filed December 21, 1908. Serial No. 468,628.

*To all whom it may concern:*

Be it known that I, WILLIAM H. RICE, of Rochester, in the county of Monroe and State of New York, have invented certain new and useful Improvements in Agricultural Implements; and I do hereby declare the following to be a full, clear, and exact description of the same, reference being had to the accompanying drawings, forming a part of this specification, and to the reference-numerals marked thereon.

The present invention relates to agricultural implements of the type employing one or more tools which penetrate the earth in order to turn or otherwise treat the same, an object being to provide improved means for mounting the pole upon the implement in such a manner that the main frame may be tilted or may be shifted horizontally at the will of the operator.

To these and other ends the invention consists in certain improvements and combinations of parts all as will be hereinafter more fully described, the novel features being pointed out in the claims at the end of the specification.

In the drawings: Figure 1 is a top perspective view of a cultivator embodying this invention; Fig. 2 is a detail top view illustrating the connection between the pole and the main frame of the machine; and Figs. 3, 4 and 5 are sections on lines 3—3, 4—4 and 5—5, respectively, of Fig. 2.

The invention is herein illustrated as embodied in a riding cultivator of the rigid or stationary axle type comprising an inverted U shaped axle 1 having outwardly turned ends on which the wheels 2 are journaled. Connected to the axle, extending longitudinally of the machine and converging toward the front end of the latter are two beams or members 3, from which depends an inverted U shaped member 4 having outwardly turned ends 5 secured to two tool carrying frames 6 by universal or swiveled connections 7. The tool carrying frames surround the wheels 2 and the tools 8 are mounted thereon in such a manner as to operate on opposite sides of the wheels, and also in rear of the latter. Elevation of the tool frames may be effected by a lever mechanism embodying a lever 9 pivoted to the main frame and yieldingly connected with the gang or tool carrying frames by a rod 10; and the sidewise movements of the tool frames relatively to the main frame of the machine may be effected by a foot lever mechanism preferably embodying a foot lever 11 pivoted to the axle at 12 and connected with its tool or gang carrying frame by a link 13.

In an agricultural implement of the type described it is desirable to provide for tilting the main frame in order that the tools will operate in a horizontal plane, because when the lever mechanism is operated to vertically adjust the tools, the forward tools will lie in a lower plane than those at the rear thereof. It is also desirable that the main frame be shifted at an angle to the line of draft in order that the machine may be adapted for side hill use. To obtain both of these results the front ends of the beams or members 3 preferably are connected by a pair of horizontal bars 14 which may have seats at their ends to fit upon the upper and lower surfaces of the members 3, and may have bolts 15 passing therethrough and through the beams to hold the bars to the latter. Connected to these bars 14 preferably so that it may turn about a vertical axis between the bars is a swinging frame which may embody a yoke member 17 carrying the pivots or trunnions 16 and having extending rearwardly therefrom two bars 18 that may be connected at their rear ends by a block 19. This frame may be guided and supported horizontally by a guide in the form of a portion 20 of the U shaped member 4 in rear of its turning axis 16; and may be held in its several adjusted positions by a locking device embodying, in this instance, a spring pressed dog 21 slidingly mounted on the block 19 and adapted to enter in one of the notches in a rack or notched segment 22 that connects the beams 3 above the portion 20.

The tilting of the machine or vertical adjustment of the pole may be effected by pivoting the latter to turn about a horizontal axis which in this instance is in the form of a pivot pin 23 arranged between the horizontal members 14 and also acting to secure the side bars 18 to the yoke 17. The pole extends rearwardly from this pivot 23 and between the side bars 18, being preferably supported in rear of its pivot by a lever mechanism or other suitable devices that may effect the vertical adjustment of the pole. The lever mechanism in this instance comprises a member 24 provided with a rack or notched segment 25, and has a lever 26 pivoted thereto at 27. This lever extends forwardly of its pivot and is pivotally connected to the link device 29 that is pivotally connected at 30 to the pole 28. The pole is held in its different adjusted positions by locking devices preferably comprising a sliding pawl or dog 31 operated by hand grip 32 on the lever 26 and adapted to coöperate with the rack 25.

To permit the operation of the tools to be watched by the operator the lever 26 is bent at 33 so that it will lie at an angle to the line of draft and a lever 34 is deflected outwardly in the opposite direction from the rear end of the swinging frame before mentioned, said lever 34 being provided to permit the pivoted frame to be shifted by an operator located on the seat 35, and a hand grip 36 on the lever being operatively connected to the latch 21 to operate the latter.

In operation, when it is desired to change the elevation of the tools 8, the levers 9 are first operated to swing the tool frames vertically about their connections 7, after which the machine is tilted to cause the tools to lie substantially in a horizontal plane by operating the lever 26 that effects the vertical adjustment of the pole 28. When the machine is operating upon the side of a hill, the lever 34 is shifted, the locking device 21 first being operated, to shift the swinging frame horizontally about the axis 16.

From the foregoing it will be seen that there has been provided a machine in which both the tilting of the main frame and the shifting of the pole horizontally for side hill work has been effected by simple and inexpensive construction which permits the two mechanisms to be operated independently without affecting each other, the parts for effecting this result being small and few in number and are not liable to get out of order.

I claim as my invention:

1. In an agricultural implement, the combination with a carriage embodying wheels and a main frame supported thereon, of a pole supporting frame pivoted on a vertical axis on the main frame so as to turn in a horizontal plane, a pole pivoted on the pole supporting frame on a horizontal axis so as to turn in a vertical plane, means for holding the pole in adjusted relation to the pole supporting frame, and means for holding the pole supporting frame in adjusted relation to the main frame.

2. In an agricultural implement, the combination with a carriage embodying wheels and a main frame supported thereon, of a pole supporting frame pivoted on a vertical axis on the main frame so as to turn in a horizontal plane and carrying a pair of rearwardly extending bars, a pole extending between said bars and pivoted on the pole supporting frame on a horizontal axis so as to turn relatively to said bars in a vertical plane, means for holding the pole in adjusted relation to the pole supporting frame, and means for holding the pole supporting frame in adjusted relation to the main frame.

3. In an agricultural implement, the combination with a carriage embodying wheels and a main frame supported thereon, of a pole supporting frame pivoted on a vertical axis on the main frame so as to turn in a horizontal plane and carrying a pair of rearwardly extending bars, a pole extending between said bars and pivoted on the pole supporting frame on a horizontal axis so as to turn in a vertical plane, said pole terminating forwardly of the rear ends of said bars, a rack mounted on the main frame and arranged above said bars, a lever carried by the pole supporting frame adapted to lockingly engage said rack, a rack mounted on the pole supporting frame, and a lever pivotally mounted on the pole supporting frame, said lever being connected to the rear end of the pole and arranged to engage the last mentioned rack.

WM. H. RICE.

Witnesses:
Harold H. Simms,
Russell B. Griffith.

---

Copies of this patent may be obtained for five cents each, by addressing the "Commissioner of Patents, Washington, D. C."